US006253610B1

(12) United States Patent
Struzik et al.

(10) Patent No.: US 6,253,610 B1
(45) Date of Patent: Jul. 3, 2001

(54) SYSTEM FOR MONITORING FLUID LEVEL

(75) Inventors: David A. Struzik; Edward A. DeToffol, both of Westerly, RI (US)

(73) Assignee: SYBA Systems, L.L.C., Norwich, CT (US)

( * ) Notice: Subject to any disclaimer, the term of this patent is extended or adjusted under 35 U.S.C. 154(b) by 0 days.

(21) Appl. No.: 09/135,323

(22) Filed: Aug. 7, 1998

Related U.S. Application Data

(60) Provisional application No. 60/056,326, filed on Aug. 12, 1997.

(51) Int. Cl.[7] .............................. G01F 23/10; G01F 23/30; H01C 10/38

(52) U.S. Cl. ................................ 73/313; 73/305; 73/308; 338/176; 338/202

(58) Field of Search ............................ 73/308, 313, 323, 73/305, 306, 322.5, 304 C; 338/33, 176, 202, 277, 194, 315, 318

(56) References Cited

U.S. PATENT DOCUMENTS

| 2,125,219 | * | 7/1938 | Campbell | 73/313 |
|---|---|---|---|---|
| 2,446,844 | | 8/1948 | Molaver | 379/106 |
| 2,871,328 | * | 1/1959 | Budd et al. | 338/202 |
| 3,000,212 | | 9/1961 | Friel | 73/304 C |
| 3,639,880 | * | 2/1972 | Oka | 338/176 |
| 4,220,047 | * | 9/1980 | Mauboussin | 73/313 |
| 4,290,059 | | 9/1981 | Noyes et al. | 340/618 |

(List continued on next page.)

FOREIGN PATENT DOCUMENTS

| 2257898 | * | 1/1974 | (FR) . |
| 173071 | * | 6/1921 | (GB) . |

OTHER PUBLICATIONS

Product Brochure For National Magnetic Sensors, Inc. Upon information and belief, the device described in this brochure was on sale prior to Aug. 12, 1997.
Product Brochure For Krueger Sentry Gauge, Inc. Upon information and belief, the device described in this brochure was on sale prior to Aug. 12, 1997.
Product Brochure For Circuitree Electronics; Publication date: May 1, 1997.
Product Brochure For Petrometer Corporation. Publication date: Feb., 1986.
Product Brochure For "Fuel Monitor" by Erie Controls; Upon information and belief, the device described in this brochure was on sale before Aug. 12, 1997.

*Primary Examiner*—Hezron Williams
*Assistant Examiner*—Michael Cygan
(74) *Attorney, Agent, or Firm*—Raymond A. Nuzzo

(57) ABSTRACT

A wiper for use in a system for monitoring fluid level in a fluid storage container. The wiper has a body portion, a first lengthwise end, a second lengthwise end, a first side, a second side opposite the first side, a width and a pair of resilient contact members electrically connected to one another. Each contact member extends from a corresponding side of the body portion. The wiper also has a guide portion attached to the first lengthwise end. The guide portion has a width larger than the width of the body portion. The wiper includes a recess formed in each side of the body portion for receiving a corresponding resilient contact member thereby allowing the resilient contact members to be compressed so as to be substantially flush with the body portion. In one embodiment, the recesses extend through the guide portion. In one embodiment. the wiper includes an electrically conductive member that has a portion thereof that is embedded in the body portion. The electrically conductive member has a first portion and a second portion extending from the first and second sides of the body portion, respectively. Each portion of the electrically conductive member defines a corresponding one of the resilient contact members.

14 Claims, 12 Drawing Sheets

U.S. PATENT DOCUMENTS

| | | | |
|---|---|---|---|
| 4,724,705 | * | 2/1988 | Harris ................................. 73/313 |
| 4,845,486 | | 7/1989 | Knight et al. ...................... 340/624 |
| 5,142,908 | * | 9/1992 | Chamblin, Sr. et al. .............. 73/319 |
| 5,196,824 | * | 3/1993 | Helm .................................... 73/308 |
| 5,619,560 | | 4/1997 | Shea .................................... 73/317 |
| 5,708,424 | | 1/1998 | Orlando et al. ................. 370/870.08 |

* cited by examiner

SYSTEM FOR MONITORING FLUID LEVEL

This application claims the benefit of the filing date of commonly owned and U.S. Provisional Application Ser. No. 60/056,326 filed Aug. 12, 1997.

BACKGROUND OF THE INVENTION

1. Field Of The Invention

The present invention generally relates to a system for monitoring the level of fluids.

2. Problem To Be Solved

In many industrial, commercial and residential settings, it is often necessary to monitor the level of fluids, such as water, fuel or oil, which is stored in tanks or other fluid holding apparatuses. Conventional fluid monitoring systems typically utilize a device that is located on the fluid storage tank which provides a visual readout of the fluid level. Such conventional systems typically use a float-type gauge that includes a pivoted or swinging arm carrying a float at its outer end. A vertically oriented rod having a top end and a bottom end is pivotally attached to the swinging arm. As the float rises and falls with the fluid level, the vertically oriented rod also rises and falls. An indicator device comprising a transparent tube or container having indicia thereon is located above the tank. The top end of the vertically oriented rod is movably disposed within the plastic tube. A scale comprising indicia is formed on the plastic tube to enable visual monitoring of the indicator. The scale may be configured to provide units of measure in fractions of the capacity of the tank or containing apparatus or in gallons, liters, etc. Such a conventional system is disclosed in U.S. Pat. No. 2,446,844.

A significant disadvantage of the conventional system described above is that the monitoring of the fluid level must take place at the fluid tank. This creates a significant inconvenience when the fluid storage tank or container is at a remote location.

Another disadvantage of the conventional system described above is that when a plurality of fluid storage tanks are present, determining the fluid level in all the tanks can be a time consuming process.

The disadvantages described above also apply to residential settings. For example, in most homes, heating fuel tanks are typically located in the basement. Use of the conventional fluid monitoring system described above requires that the home owner descend into the basement to visually monitor the fuel level in the tank. Descending into the basement may be very difficult for the elderly and may even be impossible for the handicapped.

Bearing in mind the problems and deficiencies of the conventional fluid level monitoring systems, it is an object of the present invention to provide a new and improved system for monitoring the level of fluid in a fluid storage tank or container.

It is another object of the present invention to provide a new and improved system for monitoring the level of fluid in a fluid storage tank or container that provides information concerning fluid level to a location remote from the fluid storage tank or container.

It is a further object of the present invention a new and improved system for monitoring the level of fluid in a fluid storage tank or container that can be manufactured inexpensively.

It is yet a further object of the present invention to provide a new and improved system for monitoring the level of fluid in a fluid storage tank or container that measures the fluid level in the fluid storage tank or container with a high degree of accuracy.

It is another object of the present invention to a new and improved system for monitoring the level of fluid in a fluid storage tank or container that can inexpensively be integrated with existing fluid storage tanks or containers.

Other objects and advantages of the present invention will be apparent to one of ordinary skill in the art in light of the ensuing description of the present invention.

SUMMARY OF THE INVENTION

The above and other objects, which will be apparent to those skilled in the art, are achieved in the present invention which is directed to, in a first aspect, to a system for monitoring fluid level in a fluid storage container wherein the container has a device that has a movable portion for contacting fluid in the fluid storage container and moving in response to the changes in the level of fluids in the container, the system comprises a signal sending unit and a display device. The signal sending unit is responsive to the movement of the moveable portion of the device and produces variations in the magnitude of an electrical signal wherein a particular magnitude of the electrical signal corresponds to a particular level of fluid in the fluid storage container. The display device is responsive to the magnitude of the electrical signal for displaying the level of fluid in the fluid storage container.

In a related aspect, the present invention is directed to a system for monitoring fluid level in a fluid storage container comprising:

(a) a device having a movable portion for contacting fluid in the fluid storage container and moving in response to changes in the level of the fluid in the container;

(b) a signal sending unit responsive to the movement of the movable portion, the signal sending unit producing variations in the magnitude of an electrical signal wherein a particular magnitude of the electrical signal corresponds to a particular level of fluid in the fluid storage container; and (c) a display device responsive to the electrical signal for displaying the level of fluid in the fluid storage container.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

In describing the preferred embodiments of the present invention, reference will be made herein to FIGS. 1–15C of the drawings in which like numerals refer to like features of the invention.

Figure 1:
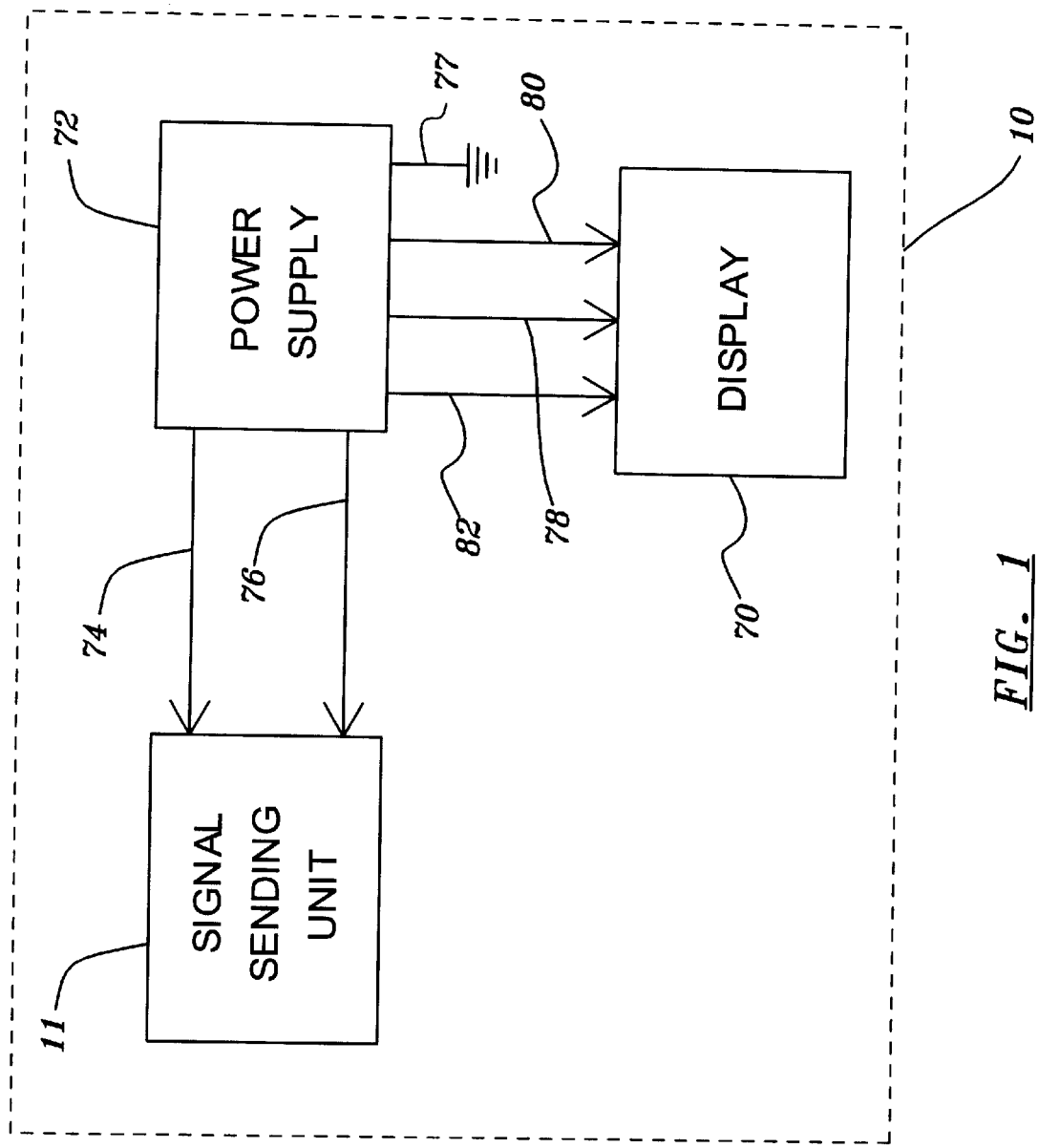
FIG. 1 is a block diagram of one embodiment of the fluid level monitoring system of the present invention.
Figure 1A:
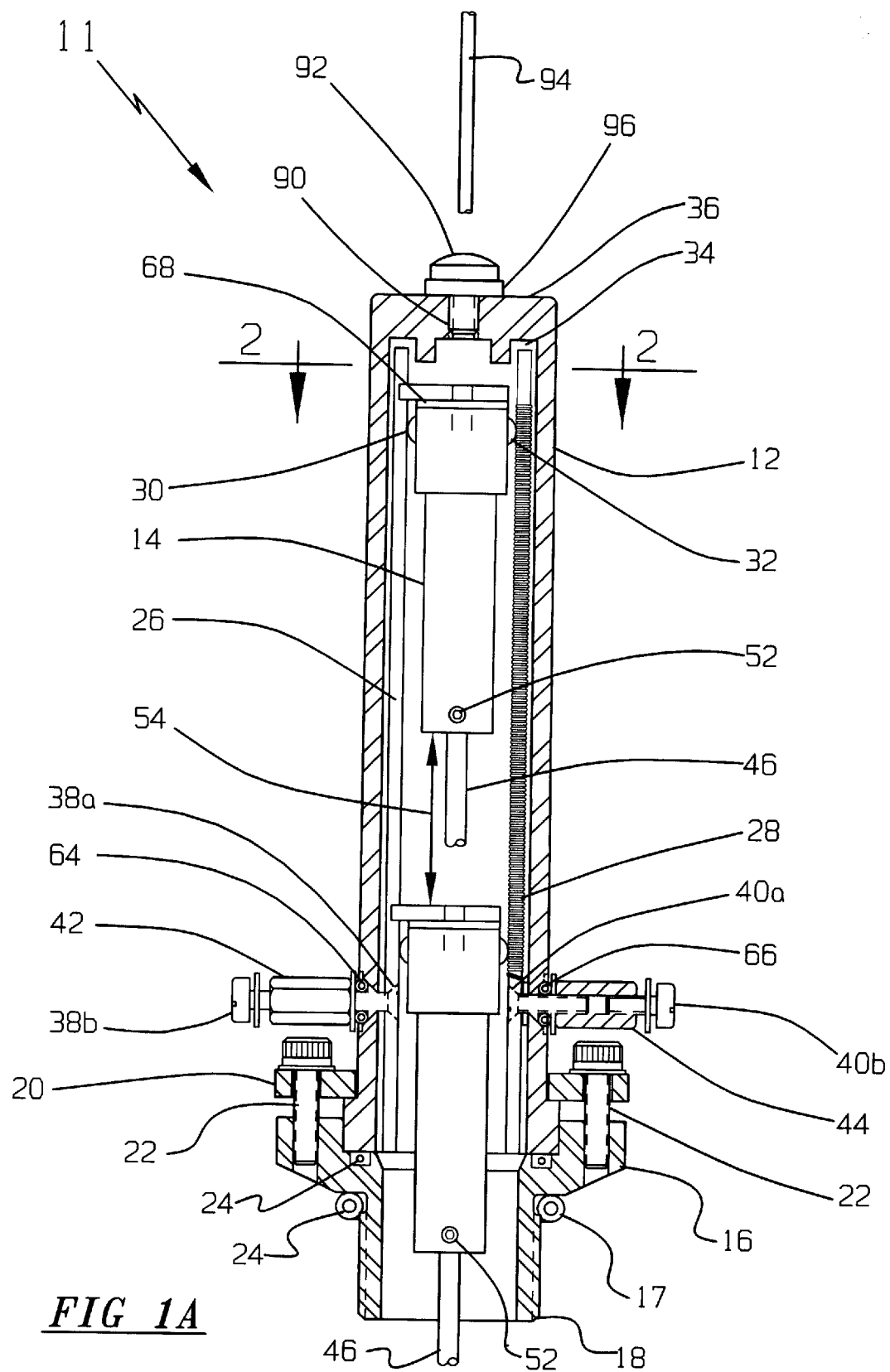
FIG. 1A is an elevational view, in cross-section, of a sending unit depicted in the block diagram of FIG. 1.
Figure 3:
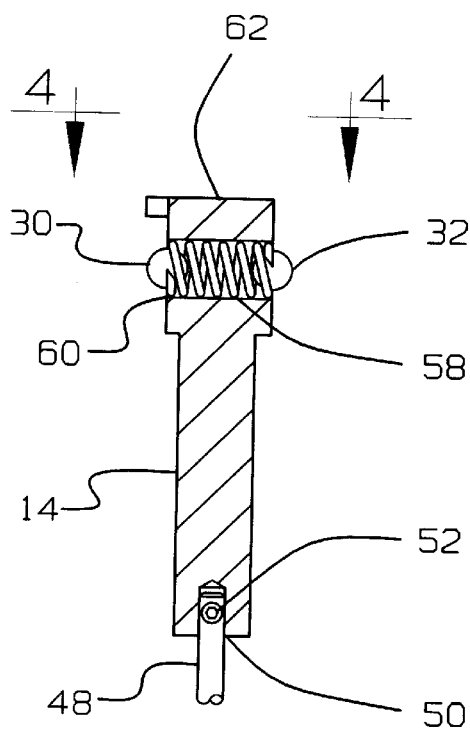
FIG. 3 is an elevational view, partially in cross-section, of a wiper shown in FIG. 1A.

Referring to FIGS. 1, 1A and 3, fluid level monitoring system 10 of the present invention includes signal sending unit 11. Sending unit 11 generally comprises transparent lens 12 and a wiper assembly operative within lens 12. The wiper assembly includes wiper 14 and is discussed in detail below. In a preferred embodiment, lens 12 is substantially cylindrical in shape. However, lens 12 may be configured in other shapes as well. In a preferred embodiment, lens 12 is fabricated from Lexan™. However, other suitable materials can also be used.

Figure 2:
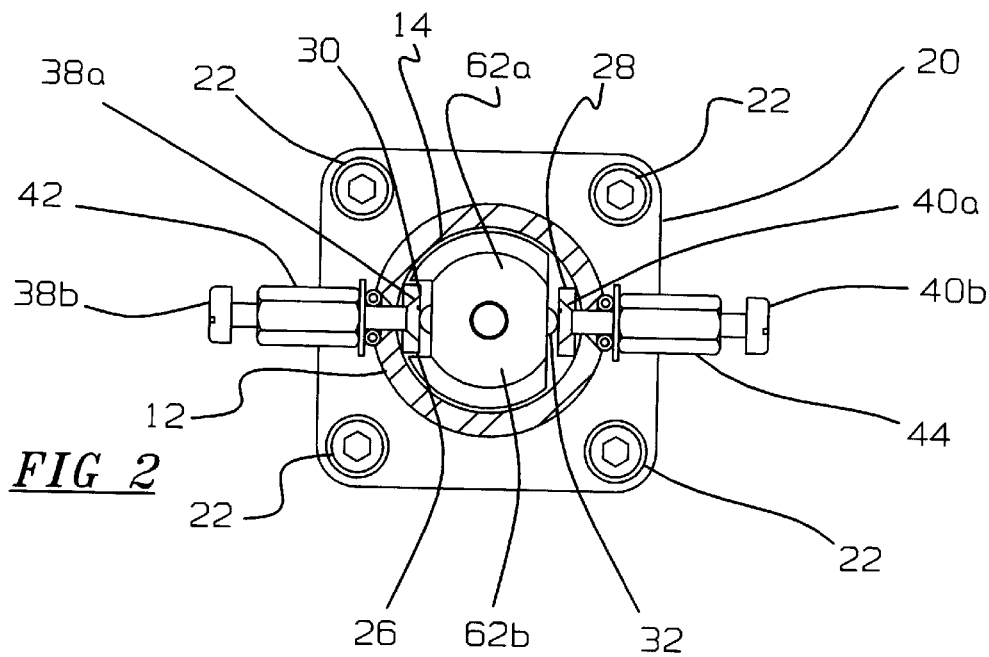
FIG. 2 is a view taken along line 2—2 of FIG. 1A.

Referring to FIGS. 1 and 2, system 10 of the present invention further comprises lens adapter 16. In the case of retrofitting an existing fluid level measurement device, lens adapter 16 is fluidly connected to the existing opening to which the conventional visual indicator lens was attached. In a preferred embodiment, lens adapter 16 is threadedly attached to the existing opening via threads 18. Lens 12 is attached to lens adapter 16 by lens retaining plate 20 and retaining screws 22. As shown in FIG. 1A, lens seal 24 is positioned between lens 12 and lens adapter 16. In a preferred embodiment, lens seal 24 is substantially washer-shaped. Other types of shapes may be used as well. Retaining screws 22 are disposed through openings in retaining plate 20 and threadedly engaged with corresponding threaded inlets formed in lens adapter 16. Seal 17 is intermediate lens adapter 16 and the existing fluid storage device and provides a fluid-tight connection between lens adapter 16 and the fluid storage device. In a preferred embodiment, seal 17 is an O-ring.

Referring again to FIGS. 1, 1A and 3, the wiper assembly comprises wiper 14, reference conductor (or commutator) 26, resistive conductor 28, and wiper brushes 30, 32 that are attached to wiper 14. Reference conductor 26 and resistive conductor 28 are positioned within the interior of lens 12. In a preferred embodiment, reference conductor 26 and resistive conductor 28 are spaced about 180° apart. In one embodiment, reference conductor 26 has a width of about 0.25 inch and a thickness of about 0.06 inch. In a preferred embodiment, reference conductor 26 comprises a silver-plated brass strip. However, it is to be understood that reference conductor 26 may be fabricated from other suitable materials with different dimensions. Reference conductor 26 and reference conductor 28 are secured against movement by slot or detent 34 formed in the upper portion 36 of lens 12. Reference and resistive conductors 26 and 28 are further secured against movement by screws 3A and 4A which are disposed through standoffs 42 and 44, respectively, and threadedly engage lens 12.

Referring to FIG. 1A, in a preferred embodiment, resistive conductor 28 is comprised of a wire-wound rheostat having a core comprised of a strip of nylon or Garrolite having a width of about ¼ inch and a thickness of about ¹⁄₁₆ inch. Preferably, the winding is comprised of #34 gauge nickel, chromium wire with 250 equidistant turns spaced across the length of the rheostat. In an alternate embodiment, resistive conductor 28 may be realized by a strip of nylon or garrote that is coated with a semi-conductive material, e.g. Cermet. The rheostat, having the configuration described above, provides variable resistances between about 0 to 200 ohms.

The winding of the rheostat can determine resistance per lineal length of conductor and behavior of the output gauge. The winding of the rheostat may be modified to compensate for the inaccuracies in monitoring fluid level resulting from the geometry of the fluid tank and the circular motion of the fluid gauge arm (referred to as the "trigonometric function"). In other words, the equidistant spacing of the winding may be altered to accommodate for non-linear fuel readings at maximum and minimum fluid levels resulting from curvature of the storage tank and to the circular movement of the float rod in the storage tank. Similarly, altering the rheostat winding also can compensate for differences in the accuracy of commercially available fluid gauges. Altering the rheostat winding, as described above, is known as "shading". Shading the rheostat enables system 10 to be integrated with existing fluid storage tanks and yet provide highly accurate information regarding the level of fluid in the storage tank. Similarly, if a Cermet strip is used, the strip is configured to have a non-linear taper in order to accommodate the non-linear fuel readings mentioned above. Altering the spacing of the winding turns of the rheostat or creating the non-linear taper, as discussed above, provide increased accuracy in the measurement of the level of fluid in the tank.

Referring to FIGS. 1A and 3, float rod 46 is movably attached to wiper 14. In one embodiment, end portion 48 of float rod 46 is disposed within bore 50 of wiper 14. Set screw collar 52 connects end portion 48 to wiper 14 and allows float rod 46 to pivot or swivel with respect to wiper 14. The ability of float rod 46 to pivot or swivel with respect to wiper 14 prevents movement of float rod 46, as a result of changes in the fluid level, from applying any torque or other forces upon wiper 14 that would impede or interfere with the movement of wiper 14. Other suitable methods of attachment may also be used that will allow for independent movement of float rod 46.

Figure 4:
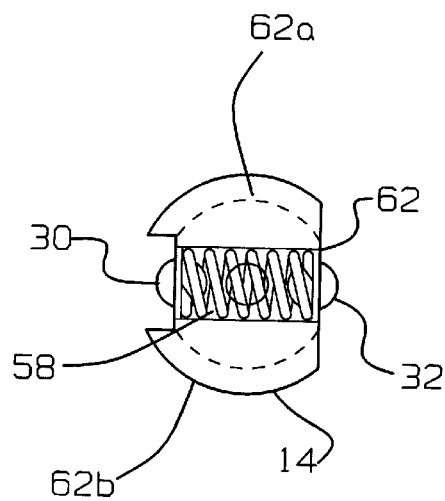
FIG. 4 is a View taken along line 4—4 of FIG. 3.

As shown in FIGS. 1A and 3, wiper 14 moves in a vertical fashion as indicated by arrow 54 as a result of the vertical movement of float rod 46. As shown in FIG. 3, conductive spring 58 is located within cavity 60 in upper portion 62 of wiper 14. Spring 58 is interposed between brushes 30 and 32 to maintain brushes 30 and 32 in constant contact with reference conductor 26 and resistive conductor 28. Referring to FIGS. 3 and 4, upper portion 62 of wiper 14 comprises portions 62a and 62b that extends on either side of reference or resistive conductors 26 or 28, respectively, so as to function as a guide in maintaining wiper brushes 30 and 32 in alignment and contact with conductors 26 and 28, respectively. Referring to FIG. 4, spring 58 is shown in phantom.

Referring to FIG. 1A, O-rings 64 and 66 are positioned within corresponding cavities or detents formed in lens 12 and are in a sealing relationship with standoffs 42 and 44. Screws 38a and 40a pass through lens 12 and threadedly engage standoffs 42 and 44. When screws 38a and 40a threadedly engage standoffs 42 and 44, O-rings 64 and 66 are compressed into the aforementioned cavities.

In one embodiment, system 10 includes an additional feature for providing visual monitoring of fluid level in a fluid tank. Specifically, lens 12 may be configured to include indicia (not shown) thereon and which represents predetermined levels of fluid in the storage tank or container. As shown in FIG. 1A, indicator stripe 68 is formed on upper portion 62 of wiper 14. Stripe 68 is horizontally oriented so as to align with the indicia on lens 12. The level of fluid in the storage tank is indicated by the position of stripe 68 with respect to the indicia on lens 12. Stripe 68 and the indicia on lens 12 enable a user, that is located at the storage tank, to visual monitor the level of fluid in the storage tank. It is to be understood that stripe 68 and the indicia on lens 12 provide an additional, but optional, feature of monitoring the fluid level in the storage tank and is not required by system 10 to provide information related to the level of fluid in the storage tank or container.

Figure 5:
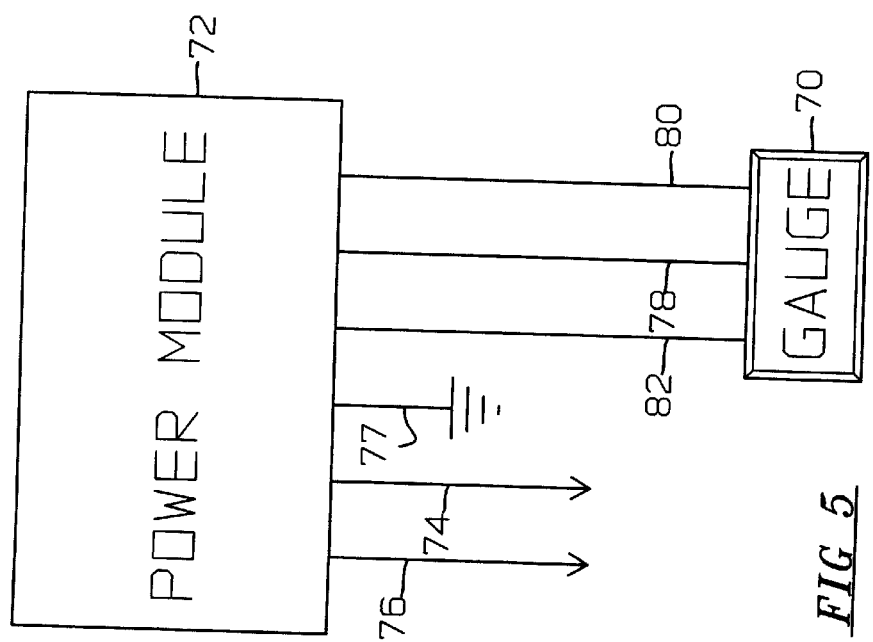
FIG. 5 is a block diagram of a power supply and fluid level gauge depicted the block diagram of FIG. 1.

Referring to FIGS. 1 and 5, system 10 further includes remote fluid level gauge 70 and power supply 72. Power supply 72 includes an input (not shown) for receiving an a.c. (alternating current) voltage. Preferably, the input a.c. voltage is between about 112 VAC and 118 VAC. More preferably, the a.c. input voltage is about 115 VAC. Power supply 72 includes a fused, low voltage d.c. (direct current) power supply transformer (not shown) that has input windings connected to the input a.c. voltage discussed above. Power supply 72 provides wire or electrical conductor 74 that connects reference conductor 26 to ground potential. Power module 72 provides wire or electrical conductor 76 that is connected to resistive conductor 28. Conductors 74 and 76 are connected to screws 38b and 40b, respectively (see FIG. 1). Power supply 72 includes internal circuitry that connects conductors 74 and 76 to output conductors 78 and 80, respectively. Power module 72 further includes conductor 77 that connects the chassis of power supply 72 to ground potential. Power module 72 also provides a supply voltage +Vcc on conductor 82. In a preferred embodiment, +Vcc is between about 12 volts d.c. and 15 volts d.c. More preferably, +Vcc is about 14 volts d.c. Conductors 78, 80 and 82 are inputted into gauge 70. In a preferred embodiment, power module 72 includes a "zero" trim potentiometer (not shown) for adjusting or calibrating gauge 84.

Figure 6:
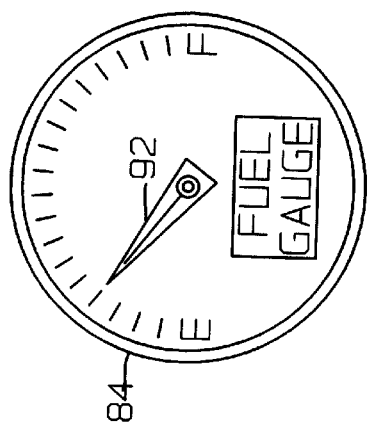
FIG. 6 is a front, elevational view of an analog gauge used in one embodiment of the gauge depicted in the block diagram of FIG. 5.
Figure 7:
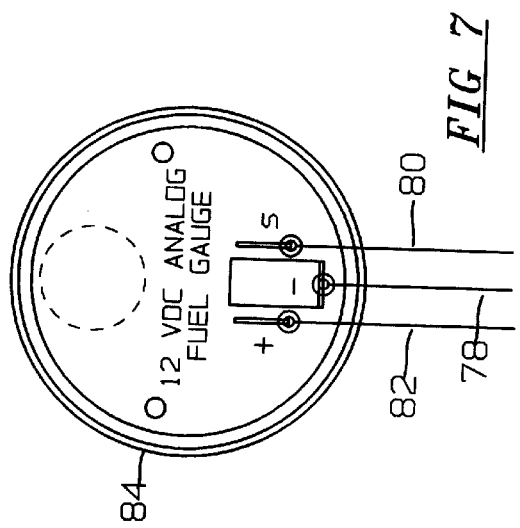
FIG. 7 is a rear, elevational view of the analog gauge shown in FIG. 6.

Referring to FIGS. 5–7, gauge 70 can be any type of commercially available digital or analog display gauge. In one embodiment, gauge 70 is realized as an analog bezel gauge 84 shown in FIGS. 6 and 7. FIG. 7 is a rear view of gauge 84. Gauge 70 can also be configured as the digital display 510 shown in FIG. 16 which is discussed below.

Referring to FIGS. 1 and 5, as float rod 46 moves vertically as a result of changes in the fluid level in the storage tank thereby causing movement of wiper 14. Brushes 30 and 32 contact reference conductor 26 and resistive conductor 28, respectively, as wiper 14 moves thereby generating a varying resistance between reference conductor 26 and screw 40. As described above, screw 40b is connected to conductor 76 which is connected to conductor 80 that is inputted into gauge 70. Since the resistance between reference conductor 26 and screw 40 varies as wiper 14 moves, the signal carried on conductors 76 and 80 is referred to as a resistive signal. Thus, as the float rod 46 moves in response to changing fluid level in the fluid tank, the resistive signal carried on conductor 80 also varies thereby causing movement of needle 92 of gauge 84.

In an alternate embodiment, sending unit 11 includes opening 90 in top portion 36 of lens 12 and screw 92, which in a preferred embodiment, is threadedly engaged with opening 90. Opening 90 is sized for receiving calibration rod 94. Washer 96 provides a hermetic seal between screw 92 and top portion 36 of lens 12. In a preferred embodiment, washer 96 is an elastomeric polyethylene washer.

Figure 8:
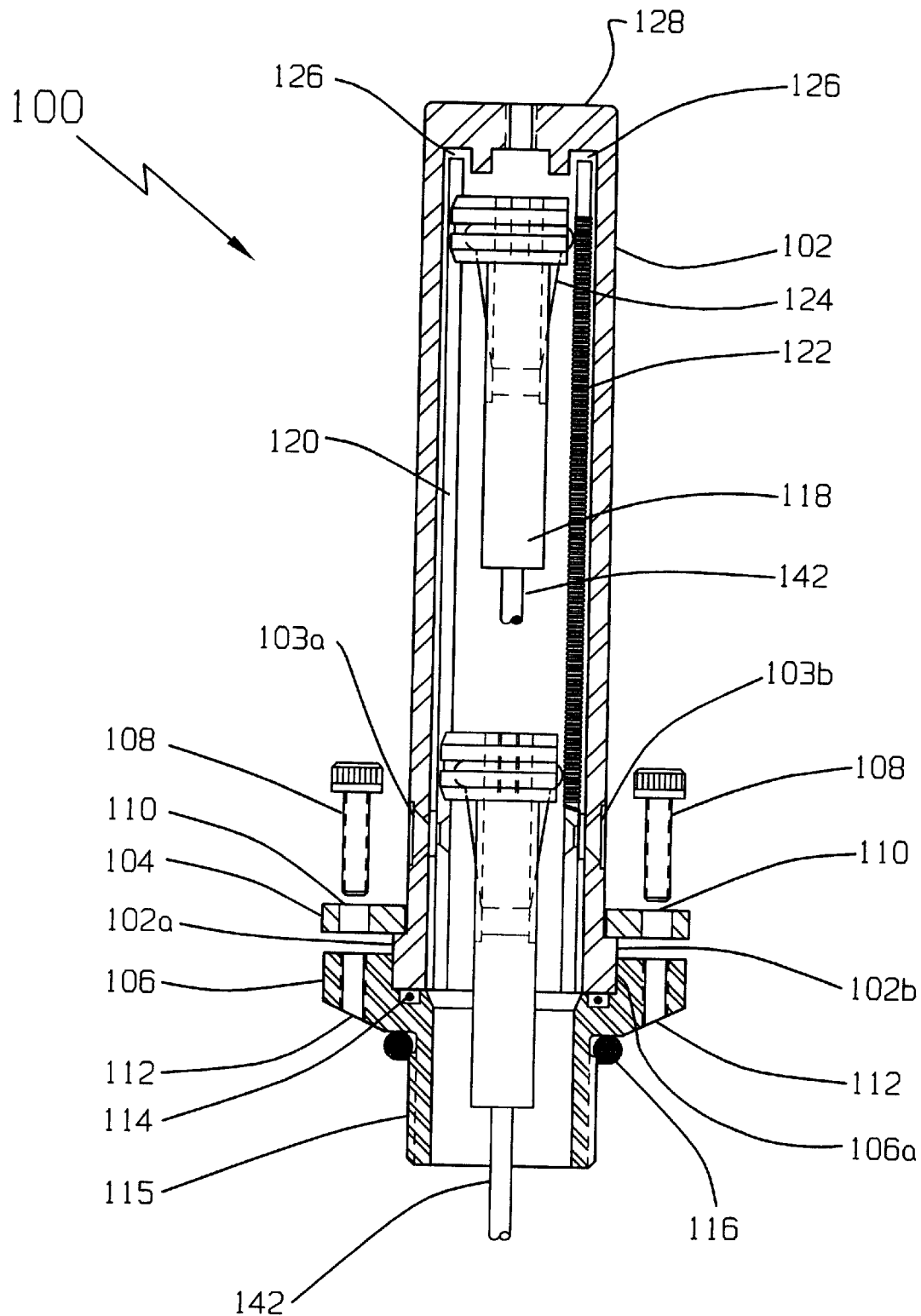
FIG. 8 is an elevational view, in cross-section, of an alternate embodiment of a sending unit.

Referring to FIG. 8, there is shown alternate system 100 for monitoring the fluid level in a storage tank or other fluid holding container. System 100 generally comprises transparent lens 102 and a wiper assembly that is operative within lens 102. In a preferred embodiment, lens 102 is substantially identical to lens 12 discussed above. However, lens 102 may be configured to have any other shape as well. Lens includes stepped portions 102a, 102b which will be described below. The wiper assembly will be 20 discussed in detail below. Lens 102 further includes openings 103a, 103b that received screws (not shown) for securing components of the wiper assembly. The aforementioned screws function in the same manner as screws 38a and 40a discussed above (see also FIG. 1A).

Referring to FIG. 8, system 100 of the present invention further comprises lens retaining plate 104 and adapter 106. Retaining plate 104 is substantially identical in construction to retaining plate 20 discussed above. Retaining plate 104 engages stepped portions 102a and 102b. Screws 108 are disposed through corresponding openings 110 in retaining plate 104 and are threadedly engaged with corresponding threaded inlets 112 formed in adapter 106. As screws 108 are threadedly inserted into openings 112, retaining plate 104 exerts a downward force upon the lens 102 so as to maintain lens 102 within bore or cavity 106a. O-ring seal 114 is positioned between lens 102 and adapter 106. The downward force created by retaining plate 104 and screws 108 in conjunction with seal 114 create a sealing relationship between lens 102 and adapter 106. In the case of retrofitting and existing fluid storage tank, adapter 106 is configured to have threads formed on portion 115 so it may be fluidly threadedly connected to the existing opening in the fluid storage tank to which the conventional visual indicator lens was attached. O-ring type seal 116 is positioned between adapter 106 and the existing fluid level measurement device. A fluid, air tight relationship is formed between adapter 106 and the fluid tank as adapter 106 is threadedly engaged with the preexisting opening in the fluid storage tank.

Referring again to FIGS. 8–12, the wiper assembly that is operative within lens 102 comprises wiper 118, reference conductor 120, resistive conductor 122, and contact member 124 that is attached to wiper 118. Reference conductor 120 and resistive conductor 122 are positioned within the interior of lens 102. In a preferred embodiment, reference conductor 120 and resistive conductor 122 are spaced about 180° apart. In one embodiment, reference conductor 120 and resistive conductor 122 are fabricated in the same manner as reference conductor 26 and resistive conductor 28, respectively, previously described above. However, it is to be understood that reference conductor 120 and resistive conductor 122 may be fabricated from other suitable materials with different dimensions. Reference conductor 120 and resistive conductor 122 are secured against movement by slots or detents 126 formed in upper portion 128 of lens 102. Reference conductor 120 and resistive conductor 122 are further secured against movement by screws (not shown) that are disposed through screw inlets 103a and 103b. The aforementioned screws 38a and 40a threadedly engage reference and reference conductors 120 and 122, respectively.

Figure 10:
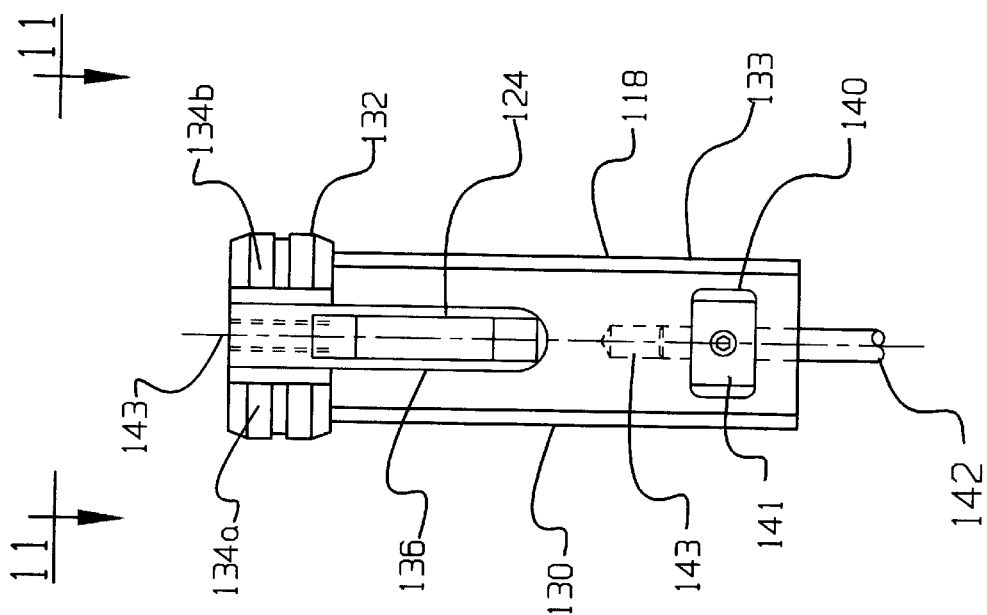
FIG. 10 is a front, elevational view of the wiper shown in FIG. 9.
Figure 9:
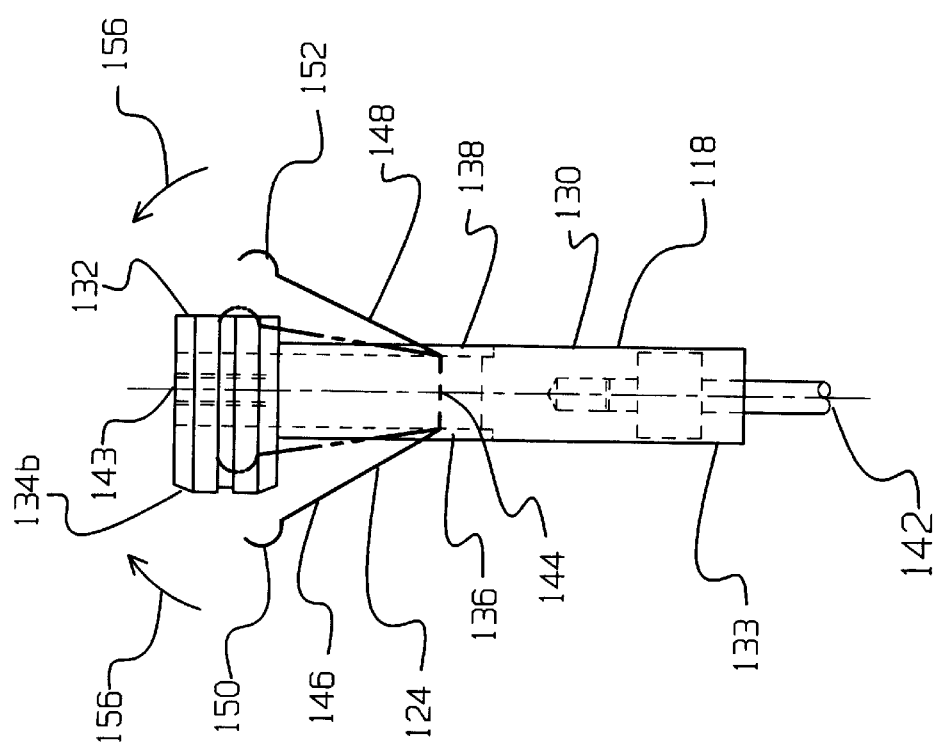
FIG. 9 is a side, elevational view of a wiper shown in FIG. 8 and illustrates the attachment of a conductive contact.
Figure 11:
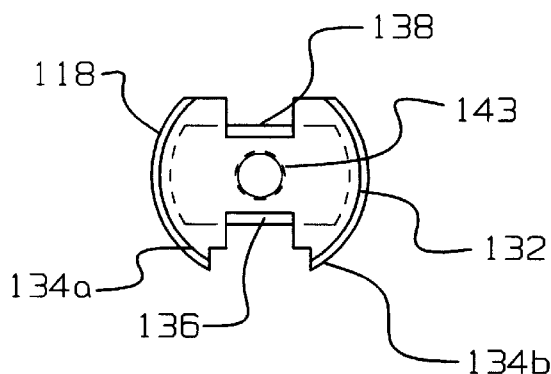
FIG. 11 is a view taken along line 11—11 in FIG. 10.

Referring to FIGS. 9–11, wiper 118 comprises body portion 130, upper portion 132 and lower portion 133. Wiper 118 is contoured for minimizing mechanical hysteresis in operation. Upper portion 132 is preferably rounded and includes extended portions 134a and 134b that contact reference conductor 120 as wiper 118 vertically moves within lens 102. Extended portions 134a and 134b function as guides and provide steady and stable movement as wiper 118 vertically moves within lens 102. Wiper 118 further includes vertically oriented recesses 136 and 138. The purpose of recesses 136 and 138 will be discussed below. Wiper 118 further includes opening or bore 140 that extends through wiper 118. Opening 140 is sized for receiving a set-screw collar (not shown) that movably attaches float rod 142 to wiper 118. In a preferred embodiment, opening 140 is rectangular shaped. The set-screw collar permits float rod 142 to swivel or rotate without applying a torque to wiper 118. Thus, any movement of float rod 142 resulting from installation or a change in fluid level in the storage tank will not impede or interfere with the movement of wiper 118. Wiper 118 further includes longitudinal bore 143 that is sized for receiving one end of the threadedly attached calibration rod described above. In a preferred embodiment, wiper 118 is fabricated from lightweight, durable nonconductive materials such as plastic, PVC, Delrin™, etc.

Referring to FIGS. 9, 10, 12 and 13, conductive contact member 124 comprises closed end 144 which is embedded within wiper 118 and sides 146 and 148 that are attached to closed end 144. Sides 146 and 148 are resilient and have curved ends 150 and 152, respectively, for contacting reference and resistive conductors 120 and 122, respectively. The curvature of ends 150 and 152 facilitates smooth and steady contact with reference conductors 120 and 122 and minimizes mechanical hysteresis. In a preferred embodiment, contact 124 is fabricated from materials that exhibit superior conductivity and connectivity to display gauge 70 with a minimum of noise and spurious signals. Preferably, the materials from which contact 124 is fabricated allow for contact with reference and resistive conductors 120 and 122, respectively, while exerting a minimum force upon conductors 120 and 122. In a preferred embodiment, the force exerted upon conductors 120 and 122 by sides 146 and 148 of contact 124 is between about 6 and 8 grams, inclusive. More preferably, the force exerted upon conductors 120 and 122 by sides 146 and 148 of contact 124 is about 7 grams. In a preferred embodiment, contact 124 is fabricated from alloys selected from the group of palladium, platinum, silver and gold. However, it is to be understood that contact 124 may be fabricated from other alloys having similar characteristics as those mentioned above. In one embodiment, contact 124 is molded into wiper 118 during the formation of wiper 118. In another embodiment, contact 124 is fixed within a square hole in wiper 118 with a stake pin. Preferably, the stake pin is fabricated from material that is similar to the material from which wiper 118 is fabricated.

Figure 12:
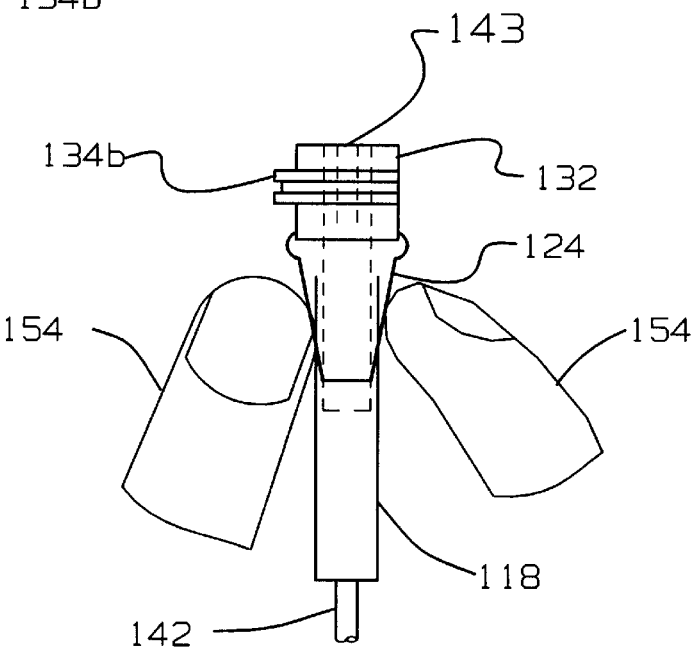
FIG. 12 is a view similar to that of FIG. 9 and illustrates how a user may depress the sides of the conductive contact member.
Figure 13:
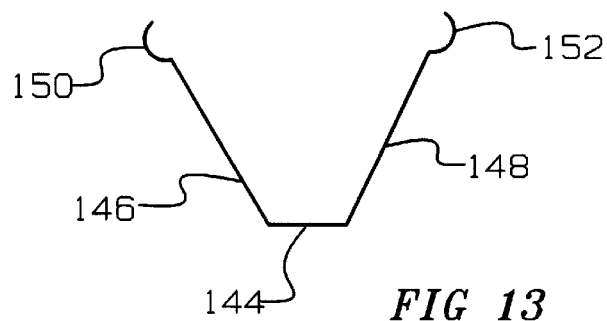
FIG. 13 is a front, elevational view of a contact member shown in FIG. 8.

Referring to FIGS. 9 and 12, during placement of wiper 118 within lens 102, a user of sending unit 100 depresses sides 146 and 148 (as indicated by arrows 156 in FIG. 9) of contact 124 with his or her fingers 154 so that sides 146 and 148 are positioned within recesses 136 and 138, respectively, of wiper 118. Thus, the resiliency of sides 146 and 148 and recesses 136 and 138 facilitate placement of wiper 118 within lens 102.

Referring to FIGS. 5 and 8, sending unit 100 is interconnected with power module 72 and gauge 84 in the same manner as system 10. Conductor 76 is connected to a screw (not shown) that is disposed within inlet 103b via the standoff and threadedly engaged with resistive conductor 122. Similarly, conductor 74 is connected to a screw (not shown) that is disposed within inlet 103a and threadedly engaged with reference conductor 120 via the standoff. Referring to FIGS. 1 and 5, float rod 142 moves vertically within lens 102 as a result of the change in fluid level in the storage tank thereby causing movement of wiper 118. Ends 150 and 152 of contact 124 contact reference conductor 120 and resistive conductor 122, respectively, as wiper 118 moves thereby generating a varying resistance between reference conductor 120 and the screw (not shown) that is disposed within inlet 103b. As described above, within power supply 72, conductor 76 is connected to conductor 80 that is inputted into gauge 70. Since the resistance between reference conductor 120 and the screw disposed in inlet 103a varies as wiper 118 moves, the signal carried on conductors 76 and 80 is referred to as a resistive signal. As the float rod 142 moves in response to changing fluid level in the fluid tank, the resistive signal carried on conductor 80 also varies thereby causing movement of needle 92 of gauge 84.

Figure 14:
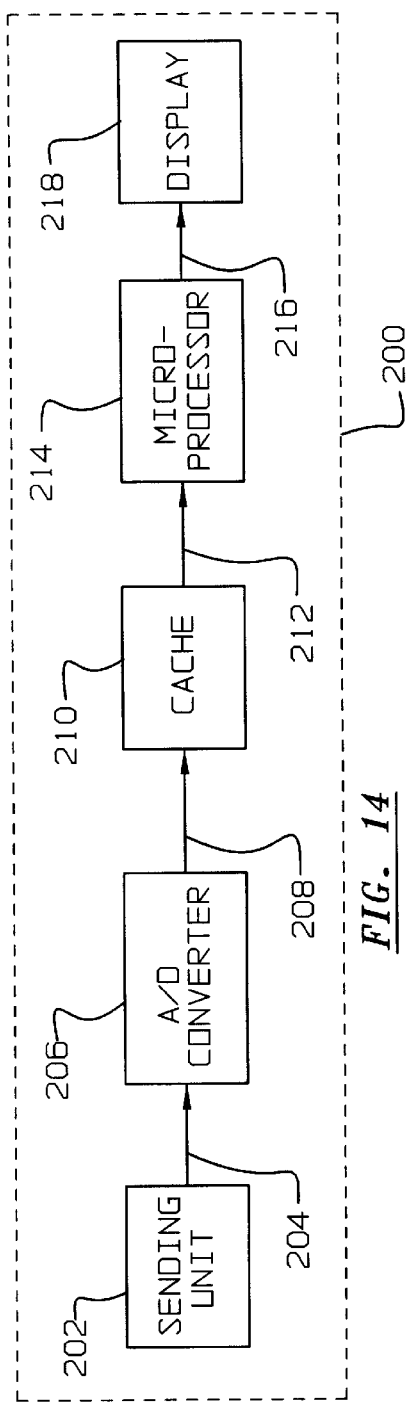
FIG. 14 is a block diagram of an alternate embodiment of the fluid monitoring system of the present invention.

Referring to FIG. 14, there is shown alternate fluid level monitoring system 200 of the present invention which provides an indication of instantaneous fluid usage. System 200 includes signal sending unit 202 that generally comprises the a lens, wiper and rheostat configuration as described above in sending units 11 and 100. Sending unit 202 includes circuitry for converting the resistive signal (described above as being carried on conductor 76) into a voltage signal 204 wherein the magnitude of the voltage at any point in time is represents a particular level of fluid in the storage tank. In a preferred embodiment, the resistive signal provides resistances between about 10 and 180 ohms. This feature has been described above in the discussions pertaining to sending units 11 and 100. In a preferred embodiment, the voltage range of signal 204 is between about 0 volts and 5 volts. Voltage signal 204 is inputted into analog-to-digital ("ADC") 206 that converts the voltage signal to a digital signal 208. The number of bits in signal 208 depends upon the desired accuracy. In a preferred embodiment, signal 208 is comprises of eight (8) bits. Digital signal 208 is then inputted into data cache 210 which temporarily caches signal 208. Data cache 210 then outputs digital signal 212 which is a time-delayed version of digital signal 208. Digital signal 212 is inputted into microprocessor 214. Microprocessor 214 can process digital signal 212 in a time-dependent format for fuel consumption rate display. Microprocessor 214 outputs digital signal 216 for input into display 218. Microprocessor 214 can also store the data as well as transmit the data to microprocessors or computers of other systems. Display 218 can be realized by a LED (light-emitting diode) display or a LCD (liquid crystal display) that displays the number represented by digital signal 216. In a preferred embodiment, display 218 displays the fluid level and the fluid usage per unit of time. Digital signal 216 is also used in the derivative time-domain for instantaneous usage calculation. Thus, system 200 can be used to determine the real-time-usage of fluid. In an alternated embodiment, analog-to-digital converter 206, cache 210 and display 218 can be realized by a single integrated circuit such as a DATEL DMS-20PC Series Display.

Figure 15:
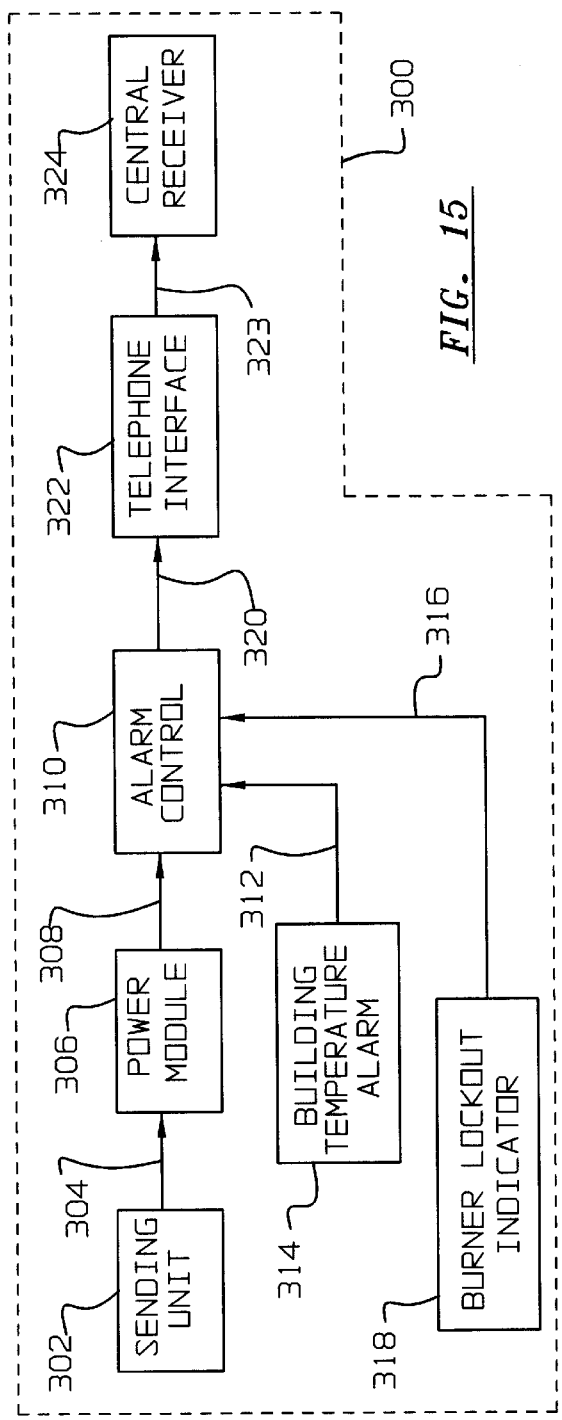
FIG. 15 is a block diagram of an alternate embodiment of the fluid monitoring system of the present invention.

Referring to FIG. 15, there is shown alternate fluid level monitoring system 300 of the present invention. System 300 includes signal sending unit 302 that generally comprises the lens and rheostat configuration as described above in sending units 11 and 100. Sending unit 302 outputs a resistive signal 304. (This is the signal described above as being carried on conductor 76). The resistance presented by signal 304 is preferably within the range of 3 and 200 ohms, inclusive, wherein the actual resistance at any point in time represents a particular fluid level in the storage tank. Signal 304 is inputted into power module 306. Power module 306 includes a comparator circuit and an alarm activation signal circuit that is responsive to the comparator circuit. The comparator circuit compares the resistance of 304 to a predetermined threshold. In a preferred embodiment, module 306 includes at least one potentiometer for varying the predetermined fluid level alarm thresholds. In one embodiment, the input threshold is set at 50 ohms for a 10–180 ohm sending unit. In a preferred embodiment, power module 306 is configured as the combination of power supply 360 and adjustment control module 374 shown in FIGS. 15A and 15B and described below.

Referring to FIG. 15, when the resistance presented by signal 304 decreases below the predetermined threshold, power module 306 outputs signals 308 that indicate the actual fuel level and that such fuel level is below the predetermined thresholds. Signals 308 are inputted into alarm control circuit 310. Alarm control circuit includes a plurality of inputs for receiving signal 312 outputted by building temperature alarm 314 and signal 316 outputted by burner lockout indicator 318. Building temperature alarm 314 includes a thermostat and is activated when the temperature within a building (in which system 300 is being used) falls below a predetermined threshold. In one example, the threshold temperature is 40°. In one embodiment, the thermostat is positioned on or in proximity to the storage tank so as to monitor the approximate temperature of the fuel as well. In another embodiment, the thermostat is located with the gauge at a remote location. In an alternate embodiment, system 300 is configured to include a programmable thermostat that will enable personnel to program threshold temperatures. In another embodiment, system 300 includes a display, similar to display 218 (see FIG. 14), that is mounted in the same housing or enclosure as the thermostat that controls the burner and building temperature. Burner lockout indicator 318 is connected to the conventional "burner reset" switch typically used in most residences and commercial buildings. Burner lockout indicator 318 is activated when the reset switch is activated for any reason, e.g. burner ignition failure, no burner fuel, etc. Thus, signal 316 indicates whether the burner reset switch has been activated.

Referring to FIG. 15, alarm control circuit 310 outputs fault signal 320 when: (i) signals 308 indicate the level of fuel in the fuel storage tank that is below the predetermined threshold, (ii) signal 312 indicates the building temperature is below a predetermined threshold, and (iii) signal 316 indicates the burner reset switch has to be activated for the burner to continue operation. Fault signal 320 is inputted into telephone interface 322. Fault signal 320 comprises the following information: (i) a signal or signals indicating whether the fuel level is below a predetermined thresholds, (ii) a signal indicating whether the building temperature is below a predetermined threshold, and (iii) a signal indicating whether the burner reset switch has to be activated for the burner to continue operation. Interface 322 includes a plurality of inputs for receiving exterior or incoming phone lines and in-house (or in-building) phone lines. In response to receiving signal 320, telephone interface 322 couples signal 323 to the external or incoming phone lines for transfer to central receiver 324. Central receiver 324 is located at a remote location and includes a computer that processes, stores and displays all the information contained in signal 323. In one embodiment, receiver 324 also includes audio alarms to notify personnel via telephone answering machines or pagers that the fluid level or other alarm conditions described above are below the predetermined threshold.

Referring to FIG. 15, in an alternate embodiment, alarm control circuit 310 comprises an audio message system that outputs a specific audio message to telephone interface 322 for transmission over the phone lines. In such a configuration, central receiver 324 comprises a voice mail system for receiving and storing the audio messages.

Figure 15A:
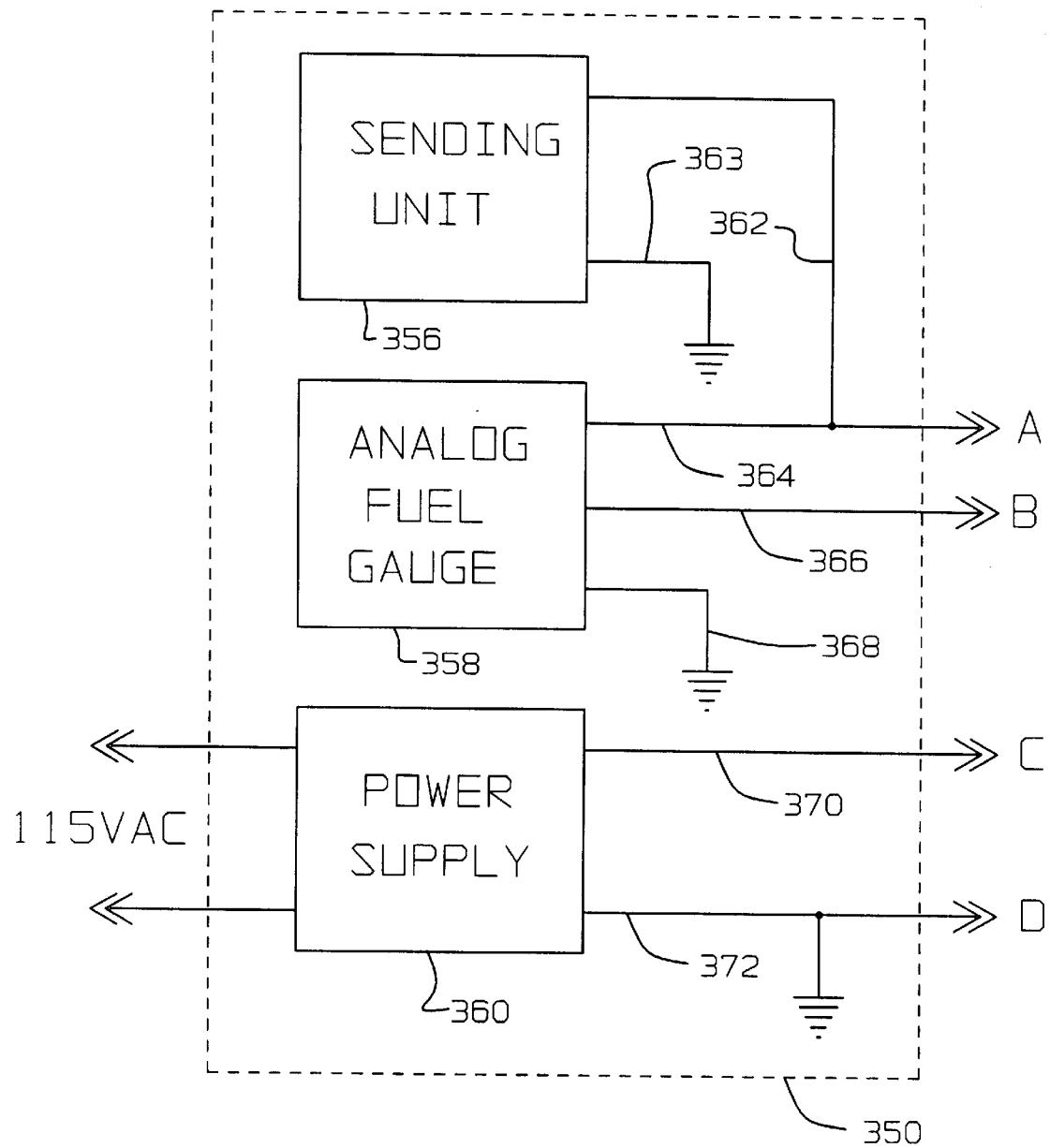
FIGS. 15A–C illustrates, partially in block diagram and partially in schematic form, an alternate embodiment of the fluid monitoring system of the present invention.
Figure 15B:
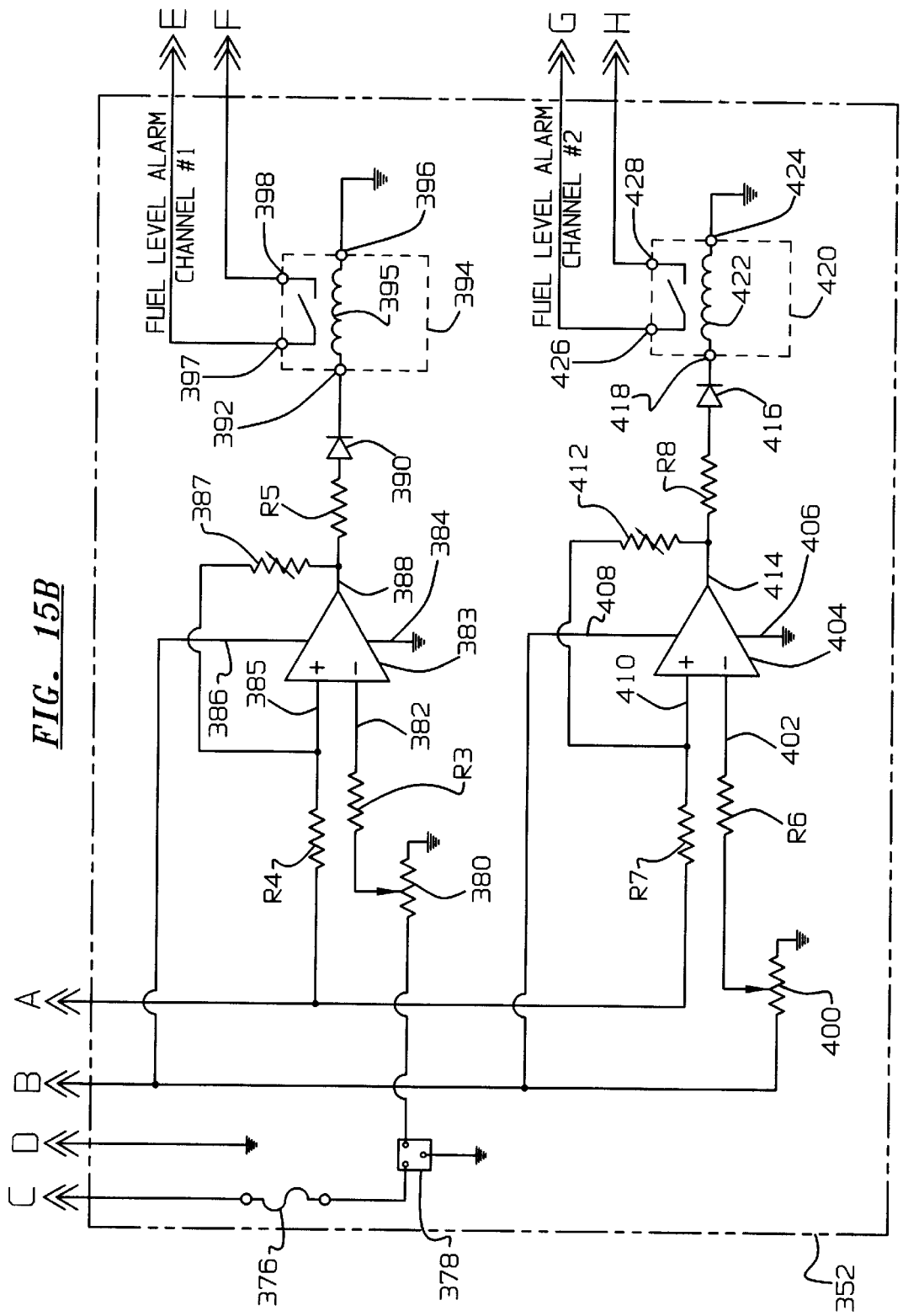
Figure 15C:
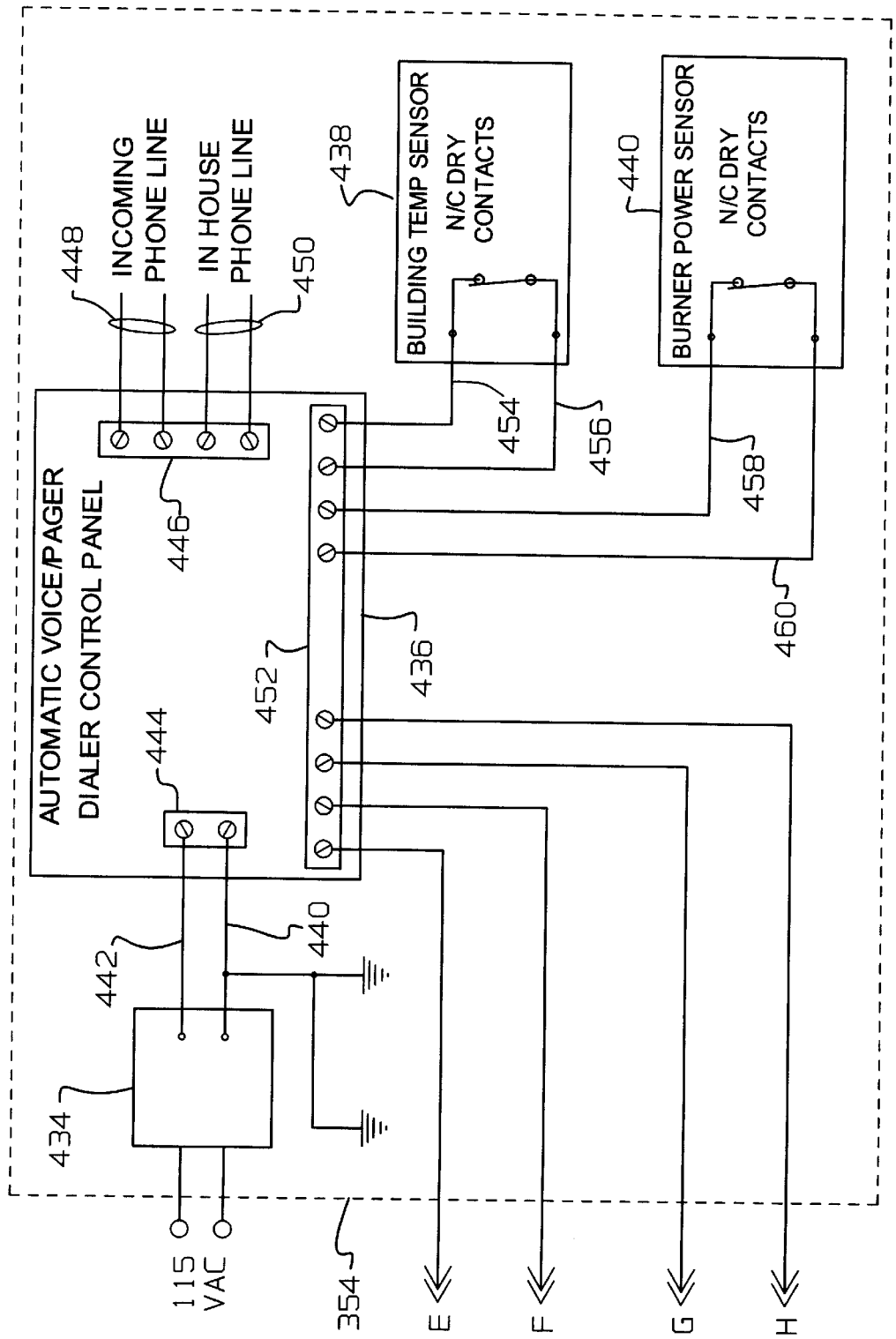

Referring to FIGS. 15A–C, there is shown another embodiment of the fluid level monitoring system of the present invention. This system comprises sections 350, 352 and 354. Section 350 comprises signal sending unit 356, analog fuel gauge 358 and power supply 360. Sending unit 356 function in the same manner as sending units 11 and 100 described above. Sending unit 356 has output 362 that carries the resistive signal that is representative of the level of fuel in the fuel storage tank. Sending units 356 and power supply 360 each have a ground node that is coupled to ground potential via conductors 363 and 372, respectively. Analog gauge 358 functions in the same manner as gauge 70 described above (see FIGS. 1 and 5). Gauge 358 includes inputs 364, 366 and a ground node coupled to ground potential via conductor 368. Power supply 360 has inputs coupled to an a.c. (alternating current) voltage source, e.g. 115 VAC, and d.c. voltage outputs 370 and 372. In a preferred embodiment, the d.c. output voltage from supply 360 is between about 18 and 25 volts VDC. Output 372 is coupled to ground potential.

Referring to FIG. 15B, section 352 comprises adjustment control module 374. Output 370 is coupled to one end of fuse 376. The other end of fuse 376 is coupled to an input of voltage regulator 378. In a preferred embodiment, regulator 378 is a 15 VDC voltage regulator. The output of voltage regulator 378 is coupled to one end of potentiometer 380. In a preferred embodiment, potentiometer 380 has a resistance range between 0 and 10 K ohms. Potentiometer 380 is adjusted to provide a predetermined fuel level threshold. The wiper of potentiometer 380 is coupled to one end of resistor R3. In a preferred embodiment, resistor R3 has a resistance of about 10 K ohms. The other end of resistor R3 is coupled to the inverting input 382 of amplifier 383. In a preferred embodiment, amplifier 383 is an operational amplifier. More preferably, amplifier 383 is a LM 358 Dual Operational Amplifier. Amplifier 383 has a ground node 384 coupled to ground potential. Referring to FIGS. 15A and 15B, power input 366 of gauge 358 is coupled to the power supply input 386 of amplifier 383. Signal input 364 of gauge 358 is coupled to one end of resistor R4. In a preferred embodiment, resistor R4 has a resistance of about 10 K ohms. Referring to FIG. 15B, adjustable resistor 387 has one end coupled to non-inverting input 385 of amplifier 383. Adjustable resistor 387 provides hysteresis adjustment for the fuel level threshold set by potentiometer 380. In a preferred embodiment, adjustable resistor 387 has a resistance range of 0 ohms to 100 Kohms. The other end of adjustable resistor 387 is coupled to output 388 of amplifier 383. Output 388 is coupled to one end of resistor R5. In a preferred embodiment, resistor R5 has a resistance of about 51 ohms. The other end of resistor R5 is coupled to the anode of light emitting diode ("LED") 390. The cathode of LED 390 is coupled to input 392 of relay 394. LED 390 functions as a relay activation indicator. Relay 394 includes a coil or inductor 395 that preferably has a 12 volt and 144 mw (milliwatt) rating. One end of 395 inductor is coupled to input 392. The other end of inductor 395 is coupled to output 396 which is coupled to ground potential. Relay 394 further includes outputs 397 and 398. These outputs will be discussed below. Amplifier 383, and its associated components, and relay 394 form one fuel level alarm channel. The positive feedback to the amplifier 383 "pulls in" relay 394 and introduces an electrical hysteresis. Adjustable resistor 387 provides activation/reset bandwidth. For example, the alarm is activated when the level in the fuel storage tank falls below ¼ tank and the relay is reset when the fuel level rises to a predetermined reset level, i.e. ⅜ tank.

Referring to FIG. 15B, adjustment control module 374 further includes a second fluid level alarm channel which will now be described. Intput 366 of gauge 358 is coupled to one end of potentiometer 400. In a preferred embodiment, potentiometer 400 has a resistance range between 0 and 10 K ohms. Potentiometer 380 is adjusted to provide a predetermined fluid threshold. The wiper of potentiometer 400 is coupled to one end of resistor R6. In a preferred embodiment, resistor R6 has a resistance of about 10 K ohms. The other end of resistor R6 is coupled to inverting input 402 of amplifier 404. In a preferred embodiment, amplifier 404 is an operational amplifier. More preferably, amplifier 404 is a LM 358 Dual Operational Amplifier. Amplifier 404 has a ground node 406 coupled to ground potential. Referring to FIGS. 15A and 15B, input 366 of gauge 358 is coupled to the power supply input 408 of amplifier 404. Signal input 364 of gauge 358 is coupled to one end of resistor R7. In a preferred embodiment, resistor R7 has a resistance of about 10 K ohms. The other end of resistor R7 is coupled to non-inverting input 410 of amplifier 404. Referring to FIG. 15B, potentiometer 412 has one end coupled to non-inverting input 410 of amplifier 404. Potentiometer 412 provides hysteresis adjustment for the fluid level threshold set by potentiometer 400. In a preferred embodiment, potentiometer 412 has a resistance range of 0 ohms to 100 Kohms. The other end of potentiometer 412 is coupled to output 414 of amplifier 404. Output 414 is coupled to one end of resistor R8. In a preferred embodiment, resistor R8 has a resistance of about 51 ohms. The other end of resistor R8 is coupled to the anode of light emitting diode ("LED") 416. The cathode of LED 416 is coupled to input 418 of relay 420. LED 416 functions as a relay activation indicator. Relay 420 includes a coil or inductor 422 that preferably has a 12 volt and 144 mw (milliwatt) rating. One end of 422 inductor is coupled to input 418. The other end of inductor 422 is coupled to output 424 which is coupled to ground potential. Relay 420 further includes outputs 426 and 428. These outputs will be discussed below. Amplifier 404, and its associated components, and relay 420 form the second fuel level alarm channel. The positive feedback to the amplifier 404 "pulls in" relay 420. Potentiometer 412 provides activation/reset bandwidth as discussed above for the first fuel alarm channel.

Referring to FIG. 15C, section 354 comprises power supply 434, automatic voice/pager dialer control panel 436, relay 438 and relay 440. In a preferred embodiment, power supply outputs 12 volts d.c. Power supply 434 has outputs 440 and 442. Control panel 436 includes contact strips 444, 446 and 452. Contact 444 is coupled to outputs 440 and 442 of power supply 434. Contact 446 is coupled to incoming phone lines 448 and in-house phone lines 450. Referring to FIGS. 15B and 15C, terminals 397 and 398 of relay 394 are coupled to contact strip 452 of control panel 436. Terminals 426 and 428 of relay 420 are also coupled to contact strip 452. Referring to FIG. 15C, relay 438 includes terminals 454 and 456 that are coupled to contact strip 452 of control panel 436. Similarly, relay 440 includes terminals 458 and 460 that are coupled to contact strip 452 of control panel 436. All connections to control panel 436 on contact strip 452 are dry contacts.

In an alternate embodiment, systems 200 and 300 may be combined with a burner-control thermostat to achieve a system for monitoring the level of fluid in a storage tank that allows (i) display of the fluid level in the storage tank, (ii) control of the temperature of the temperature of the building housing the storage tank, (iii) the below-threshold temperature, and (iv) the instantaneous fluid usage rate to be observed at a remote location. In such a configuration, display 218 is incorporated into central receiver 324. Systems 200 and 300 are suitable for situations wherein the usage of fluids, such as fuel, oil, gas, drinking water, etc. must be monitored for reasons related to fluid conservation.

Figure 16:
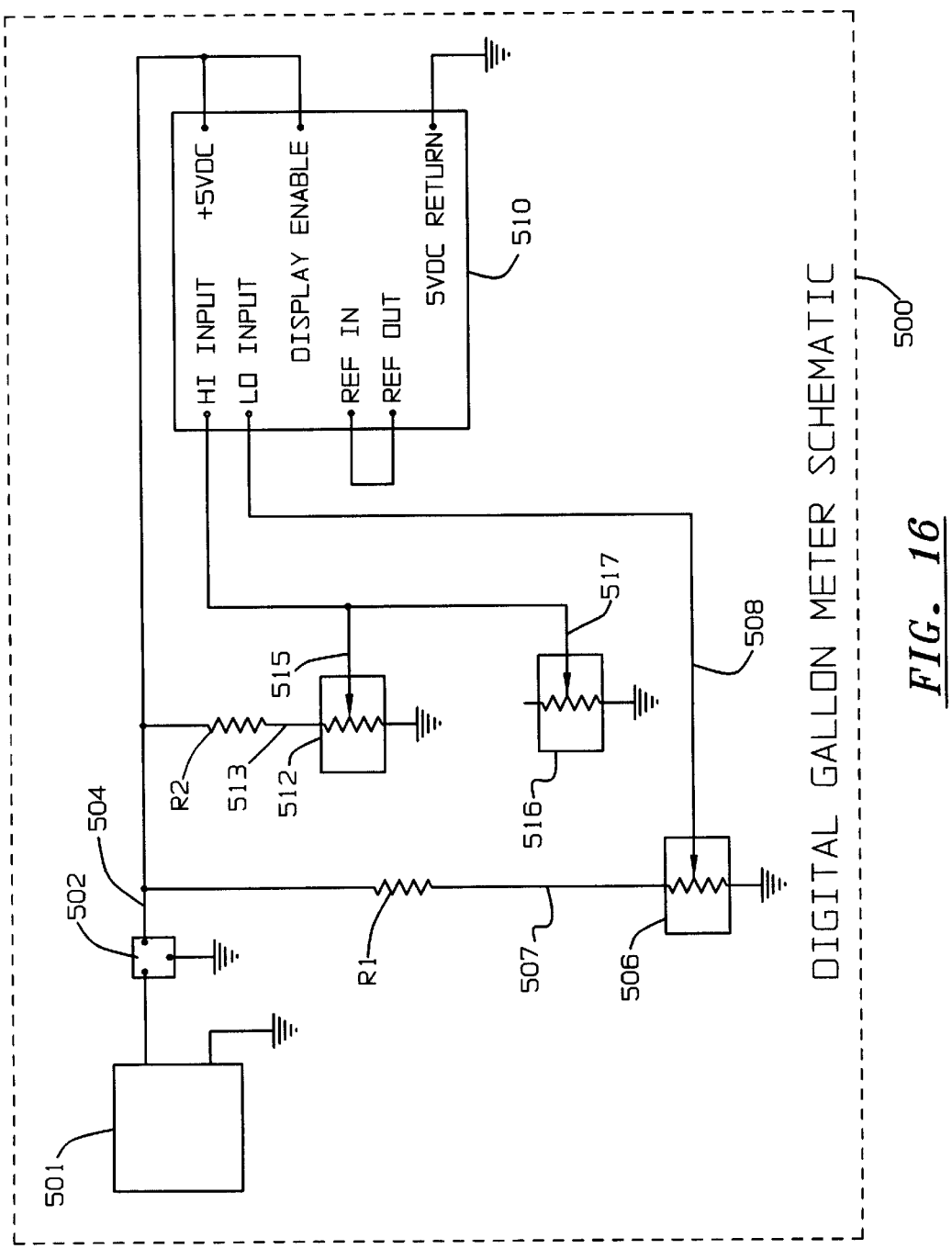
FIG. 16 is a block diagram of an alternate embodiment of the fluid monitoring system present invention.

Referring to FIG. 16, there is shown alternate system 500 of the present invention for remote monitoring the level of fluids in a storage tank. Although the ensuing description is in terms of specific voltages and circuitry, it is to be understood that system 500 may be configured to use other types of circuitry and voltage levels. System 500 includes power supply 501. In a preferred embodiment, the supply voltage +Vcc is 12 volts d.c. @ 500 ma. (milli-amperes). Power supply 72 (see FIG. 5) may be used to supply the voltage +Vcc. The supply voltage +Vcc is inputted into voltage regulator 502. In a preferred embodiment, regulator 502 is a five (5) volt regulator and outputs five (5) volt line 504. Line 504 is coupled to one end of resistor R1 and resistor R2. In a preferred embodiment, resistor R1 has a resistance of about 48 K ohms and resistor R2 has a resistance of about 4K ohms. System 500 further includes a "zero trim" adjustment circuit 506. In a preferred embodiment, circuit 506 is configured as a potentiometer that has input 507 and wiper 508. The potentiometer of circuit 506 preferably has a resistance range between 0 ohms and 50 K ohms, inclusive. Input 507 is coupled to the other end of resistor R1. Wiper 508 is coupled to "INPUT LOW" of digital meter 510.

Referring to FIG. 16, display 510 is preferably a digital volt meter. Display 510 receives a supply voltage from voltage regulator 502. In a preferred embodiment, voltage regulator circuit 502 provides a regulated output voltage of 5 volts d.c. Resistors R1 and R2 are padding resistors that protect display 510 from over-voltage during adjustment of the potentiometers of circuits 506 and 512.

Referring to FIG. 16, system 500 further includes "span" adjustment circuit 512. In a preferred embodiment, circuit 512 is configured as a potentiometer that includes input 513 and wiper 515. The potentiometer of circuit 512 preferably has a resistance range between 0 ohms and 46 K ohms, inclusive. The other end of resistor R2 is coupled to input 513. The wiper 515 is coupled to "INPUT HIGH" of digital meter 510.

Referring to FIG. 16, system 500 further includes circuit 516 that produces a signal that is representative of the level of fluid in the storage tank. In preferred embodiment, circuit 516 is configured as sending units 11 or 100 described above. Thus, circuit 516 comprises a wiper, a reference conductor and resistive conductor. The reference conductor of circuit 516 is connected to wiper 517 of circuit 512. As described in above for sending units 11 and 100, the wiper of circuit 516 moves between the reference conductor and resistive conductor. Circuit 516 outputs a resistive signal that is coupled to wiper 515 of circuit 512. Adjustment circuit 512 provides for adjustment of the level of the resistive signal to a predetermined level that corresponds to a given fluid or liquid storage tank capacity that is within the operational limits of the digital meter.

The present invention provides systems that may be used to monitor the (i) fluid or liquid level in a fluid storage device, (ii) the temperature of the building that houses the fluid storage device, and (iii) usage rate of any type of fluids, e.g. water, fuel, oil, gas, etc. and provide the monitored parameters to remote locations. The present invention:

a) is inexpensive to manufacture;

b) can be integrated into level measurement devices of existing fluid storage tanks;

c) uses a minimum of electrical power;

d) can be used to monitor the usage of water and fuels for purposes of conservation; and e) provides highly accurate data regarding the level and the usage of the fluids as well as the temperature of the housing in which the fluid is stored.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A wiper comprising a body portion, a first lengthwise end, a second lengthwise end, a first side, a second side opposite the first side, a width and a pair of resilient contact members electrically connected to one another, each resilient contact member extending from a corresponding side of the body portion, the wiper further comprising a guide portion attached to the first lengthwise end and having a width larger than the width of the body portion, the wiper including a recess formed in each side of the body portion for receiving a corresponding resilient contact member thereby allowing the resilient contact members to be compressed so as to be substantially flush with the body portion.

2. The wiper according to claim 1 wherein the recesses extend through the guide portion.

3. The wiper according to claim 1 wherein the wiper includes an electrically conductive member having a portion thereof that is embedded in the body portion, the electrically conductive member having a first extending portion and a second extending portion extending from the first and second sides of the body portion, respectively, each extending portion of the electrically conductive member defining a corresponding one of the resilient contact members.

4. A wiper comprising a body portion, a first lengthwise end, a second lengthwise end and a width, the wiper further comprising a guide portion attached to the first lengthwise end and having a width that is larger than the width of the body portion, the guide portion having a first side, a second side opposite the first side, a bore extending between the first side and second side, the bore having first and second openings on the first and second sides, respectively, the wiper further comprising a pair of electrically conductive contacts, each contact being positioned within the bore adjacent a corresponding opening of the bore, the guide portion being configured so as to prevent the contacts from being completely dislodged from the bore, the wiper further comprising a spring interposed between the contacts so as to urge the contacts toward the openings of the bore such that each contact partially protrudes from its corresponding opening of the bore.

5. A wiper assembly for use in a system for monitoring fluid level in a fluid storage container wherein the system has a device that contacts fluid in the fluid storage container and moves in response to the changes in the level of fluid in the container, and a lens attached to the container for viewing a portion of the device, the wiper assembly comprising:

a resistive conductor sized for placement within the lens, the resistive conductor having a first end and a second end, the resistive conductor providing an electrical resistance between the first end and any other portion of the resistive conductor wherein the resistance of the conductor increases as said any other portion approaches the second end;

a reference conductor sized for placement within the lens without physically contacting the resistive conductor;

a wiper configured for attachment to a portion of the device and movement between the resistive and reference conductors wherein the movement of the wiper is responsive to the movement of the device, the wiper comprising a body portion that is sized so as to not contact the reference and resistive conductors, the body portion having a first lengthwise end, a second lengthwise end, a first side and a second side, the wiper further comprising a pair of resilient contact members electrically connected to one another, each contact member extending from a corresponding side of the body portion, the wiper further comprising a guide portion attached to the first lengthwise end and sized for constantly and simultaneously contacting the reference and resistive conductors so as to facilitate steady movement of the wiper as the wiper moves between the reference and resistive conductors, the wiper having a recess formed in each side of the body portion for receiving a corresponding resilient contact member thereby allowing the resilient contact members to be compressed so as to be substantially flush with the body portion, whereby the movement of the wiper causes variations in the magnitude of an electrical signal that is produced and measured between the reference conductor and the first end of the resistive conductor when a voltage potential is applied to reference conductor and the first end of the resistive conductor, the magnitude of the electrical signal corresponding to the level of fluid in the fluid storage container; and a display device configured for receiving the electrical signal and indicating the level of fluid in the container.

6. The wiper assembly according to claim 5 wherein the wiper is configured to be removably attached to the device.

7. The wiper assembly according to claim 5 wherein the recesses extend through the guide portion.

8. The wiper assembly according to claim 5 wherein the device comprises a rod having a first end, a second end, and a float attached to the first end for floating upon the surface of the fluid in the container, the wiper being removably attached to the second end of the rod.

9. The wiper assembly according to claim 5 wherein the wiper further comprises an electrically conductive member having a portion thereof that is embedded within the body portion, the electrically conductive member having a first portion and a second portion extending from the first and second sides, respectively, of the body portion, each extending portion of the electrically conductive member defining a corresponding one of the resilient contact members.

10. A system for monitoring fluid level in a fluid storage container, comprising:

a device having portion that contacts fluid in the fluid storage container and that moves in response to the changes in the level of fluid in the container;

a lens attached to the container for viewing a portion of the device;

a resistive conductor positioned within the lens, the resistive conductor having a first end and a second end, the resistive conductor providing an electrical resistance between the first end and any other portion of the resistive conductor wherein the resistance of the conductor increases as said any other portion approaches the second end;

a reference conductor positioned within the lens and spaced apart from the resistive conductor;

a wiper moveably positioned between the resistive and reference conductors, the movement of the wiper being responsive to the movement of the device, the wiper comprising a body portion that is sized so as to not contact the reference and resistive conductors, the body portion having a first lengthwise end, a second lengthwise end, a first side and a second side opposite the first side, the wiper further comprising a pair of resilient contact members electrically connected to one another, each contact member extending from a corresponding side of the body portion, the wiper further comprising a guide portion that is attached to the first lengthwise end and is sized for constantly and simultaneously contacting the reference and resistive conductors so as to facilitate steady movement of the wiper as the wiper moves between the reference and resistive conductors, the wiper including a recess formed in each side of the body portion for receiving a corresponding resilient contact member thereby allowing the resilient contact members to be compressed so as to be substantially flush with the body portion, whereby the movement of the wiper causes variations in the magnitude of an electrical signal that is produced and measured between the reference conductor and the first end of the resistive conductor when a voltage potential is applied to reference conductor and the first end of the resistive conductor, the magnitude of the electrical signal corresponding to the level of fluid in the fluid storage container; and a display device configured for receiving the electrical signal and indicating the level of fluid in the container.

11. The system according to claim 10 wherein the the device comprises:

a rod having a first end and a second end; and a float attached to the first end for floating upon the surface of the fluid in the container, the wiper being attached to the second end of the rod.

12. The system according to claim 10 wherein the wiper further comprises an electrically conductive member having a portion thereof that is embedded within the body portion, the electrically conductive member having a first portion and a second portion extending from the first and second sides, respectively, of the wiper body portion, each portion of the electrically conductive member defining a corresponding one of the resilient contact members.

13. The system according to claim 10 further comprising a power supply for providing a voltage potential to the reference conductor and the first end of the resistive conductor.

14. The system according to claim 10 wherein the display device comprises:

an analog to digital converter having an input for receiving the electrical signal and an output for providing the digital representation of the electrical signal; and a digital display having an input coupled to the output of the analog to digital converter.

* * * * *